UNITED STATES PATENT OFFICE.

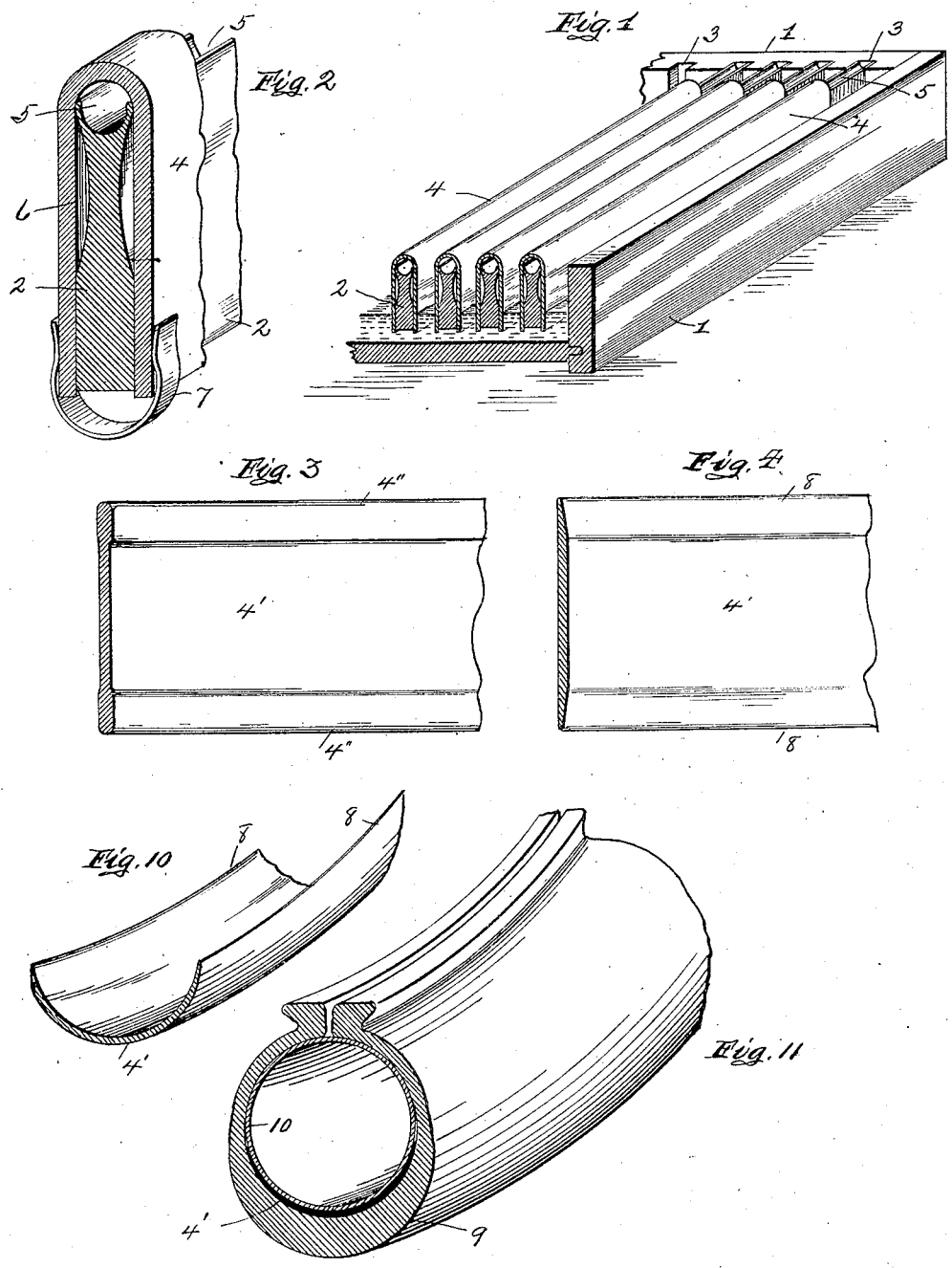

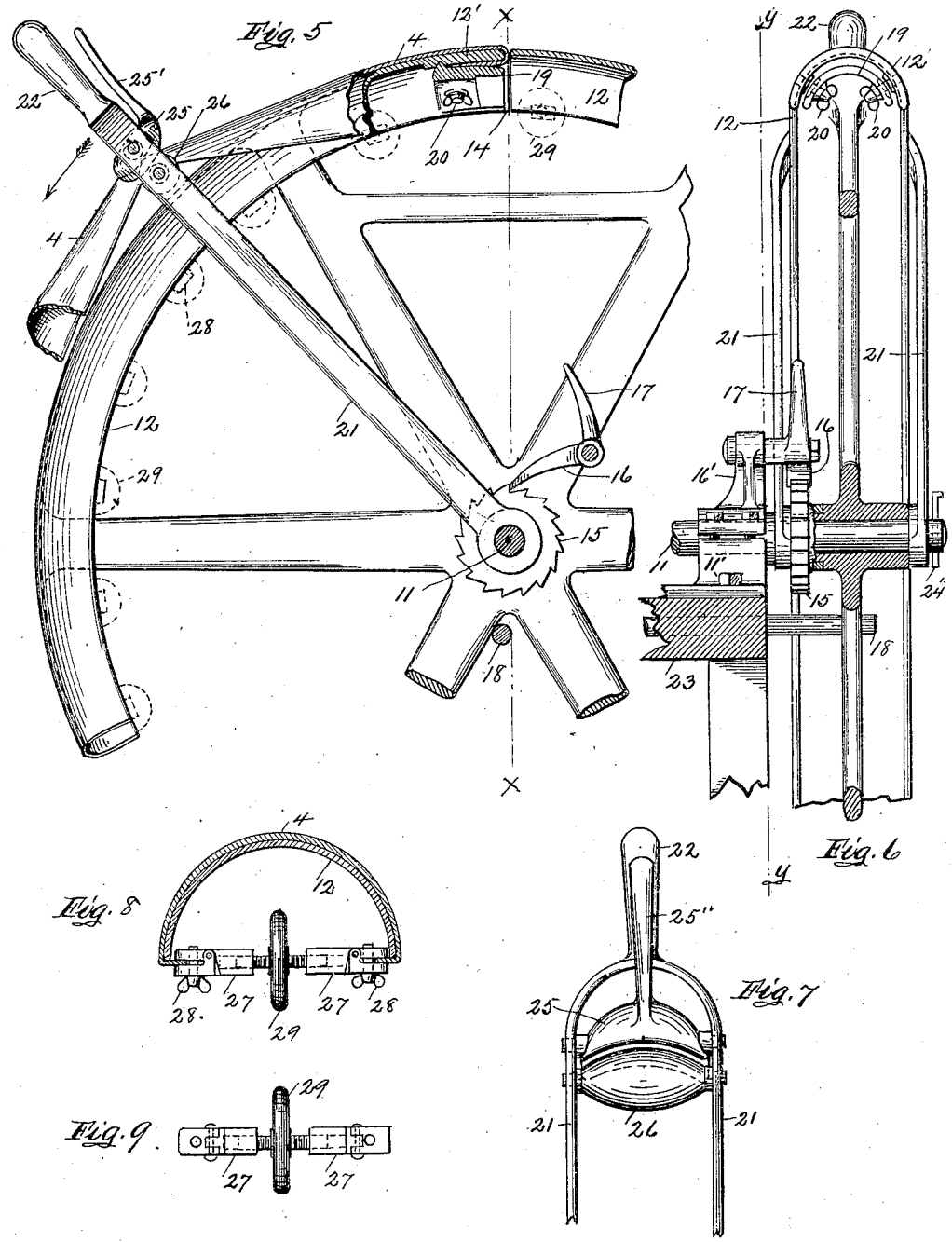

OTTO A. HENSEL, OF PITTSBURG, PENNSYLVANIA.

PROCESS FOR MAKING SHIELDS OR ARMOR FOR PNEUMATIC TIRES.

No. 879,768.　　　　　Specification of Letters Patent.　　　　Patented Feb. 18, 1908.

Application filed August 31, 1906. Serial No. 332,865.

*To all whom it may concern:*

Be it known that I, OTTO A. HENSEL, a citizen of the United States, residing at Pittsburg, in the county of Allegheny and State of Pennsylvania, have invented certain new and useful Improvements in Processes for Making Shields or Armor for Pneumatic Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a process for making shields or armor for pneumatic tires, the object being to form from hide or skins, shields or armors that will be puncture proof, heat and moisture resisting, for use in the tires of automobiles and such other vehicles using pneumatic tires, and with this end in view my invention consists in subjecting the hides from which said shields are to be made, to a certain chemical treatment, combined with the chemical action and changes due to exposure to light and various degrees of temperature, as will be fully set forth hereinafter.

The pneumatic tire in common use for automobiles and other vehicles comprises (as is well known) an inner tube and an outer shoe, each made from soft rubber, the said shoe for the purpose of protecting the inner tube from premature or accidental puncture, due to passing over nails, broken glass, sharp stones, &c. To provide a shield or armor, that will be practically puncture proof, is the principal object of my present invention.

Another object of my invention is to form such shields or armor in a manner that the inner or air-retaining tube will not be injured from contact with the shield; this I accomplish by softening or reducing the raw sharp edges of the shield to the same consistency as that of the rubber tube and at the same time preserving and maintaining the hard intensified part exposed to the puncturing obstacles frequently met along all highways.

Another object of the present invention is to provide a shield or armor for the above specified purpose, which will withstand a high degree of temperature. This is essential when speeding the automobile from forty to sixty miles and upward, per hour, as at such time the tires become heated to a high temperature and if such provision is not made (in this class of armors) such high temperature will destroy the efficiency of the shield unless formed to resist heat.

A further object of the invention is to remove, from the shield, all such substances as would be injurious to the rubber shoe or inner tube, such substances comprising fat, oil or grease, all of which are detrimental to the life of rubber.

Another object to be attained and essential to the shield or armor, is to render the same water-proof. The outer covering or shoe is often broken, punctured or torn in such manner as to admit water or moisture to the shield, and it is obvious that, by rendering said shield water-proof no evil consequence should arise from this source.

A still further object of the invention is to so form the shield or armor as not to mar, impair, detract, or to be detrimental to any of the essential qualities of such pneumatic tires, and to provide such armor with a resiliency and a yielding nature equal to that of the inflated tire.

Another object of the invention is to so treat the hide or strips, as to harden and render the same puncture-proof by the contraction and cementation of the fiber, in place of accomplishing said hardening by pressure of rolls or other mechanical apparatus, which latter treatment tends to stretch and reduce the armor in thickness, thereby offering less resistance to puncturing objects.

With these above-enumerated and other minor objects in view, I will now proceed to describe the process by which this hardening or densifying of the hide or skin may be attained, and in order to render the said process more clear and concise, I have shown several views of special apparatus for carrying out the details; a brief description of said views as shown in the accompanying drawings, is as follows—

Figure 1 is a perspective view of a portion of a vat, showing the depth of the solution and the manner in which the strips of hide are supported therein for the purpose of softening their edges. Fig. 2 is a full sized perspective view of a portion of one of the supports removed from the vat and having a piece of hide clamped thereon, the construction of said slat or support being such as to admit light and free circulation of air about certain portions of the hide. Fig. 3 is a perspective view of a part of a strip of hide after treatment in said vat. Fig. 4 is a similar view showing the reduction of the thickened edges of the strip. Fig. 5 is a side elevation of a portion of a forming wheel on which a strip of hide is secured and permitted to dry and densify; together with the means for stretching and clamping the said strip thereon. Fig. 6 is a side sectional elevation of the same, said section taken on the line X—X, of Fig. 5. Fig. 7 is an end elevation of a portion of the stretching lever, showing the construction of the eccentric clamp for grasping the strips of hide at any point along its length. Fig. 8 is an enlarged sectional elevation of the rim of the stretching and drying wheel, together with a cross section of the strip, and elevation of one of the clamps for holding said strip in position. Fig. 9 is a plan view of said clamp. Fig. 10 is a perspective view of a portion of the finished article. Fig. 11 is a similar view of a portion of an automobile tire in cross section, having my improved armor inserted between the inner tube and shoe.

To reduce my invention to practice, I take a green hide or skin and by means of lime and water, remove the hair, grease, oil and fat, in accordance with any of the well known methods now in common use. The hide is now cut lengthwise into strips approximately five to six inches in width and then immersed in a saturated solution of bichromate of potash, $(K_2Cr_2O_7)$ of full strength, until the gelatin in the skin becomes mordanted or fixed. This usually occupies a period of from six to eight hours, more or less, according to the thickness of the hide operated upon. The strips are then withdrawn from this solution, drained and placed over supports or slats and conveyed to the vat for softening and exposing certain parts to the action of diffused daylight.

The supports or slats (see Figs. 1 and 2,) consist of thin strips of wood or other suitable material, having recessed top 5, and recessed sides 6, which when a strip of hide, (see Fig. 2) is doubled over the slat, air will be permitted to circulate and come in contact with a portion of the inner surface of said strip and said inner surface be exposed to the action of diffused daylight. The lower edges of the strip 4, when thus placed on the slat 2, are clamped and held firmly along the length of said slat by means of spring clamps 7, arranged at short intervals. After the strips 4 are thus treated and clamped to their slats 2, they are taken to the vat 1, and arranged and supported in slots therein, the one strip parallel to the other.

Placed in the vat 1, is a solution consisting of about nine gallons of water, four pounds of alum, three pounds of sodium chlorid and a saturated solution of one gallon of bichromate of potash. The depth of this solution is such as to immerse the lower edges of the strips 4. This above-described solution will at once combine with the previous-absorbed liquor in the strips and swell or expand and separate the fiber of the hide, combine with the gelatin therein and soften the immersed edges, as shown at Fig. 3 of the drawings. The strips 4 are permitted to remain in the vat two or three days, and while the softening of the edges is in progress, the balance of the strip is exposed to the action of diffused daylight, which will harden said exposed part, as the gelatin in the skin will become insoluble. The strips of hide are now ready to be shrunk and densified by immersing the same in a solution containing three parts gelatin, two parts bichromate of potash and ninety-five parts water. This solution is brought to a temperature of about two-hundred degrees, Fahrenheit, before the strips are placed therein, and the temperature is then brought to approximately two-hundred and thirteen degrees and the strips allowed to remain therein for two or three minutes according to the thickness of the hide. The strips are now removed from this last-described solution, drained and placed in another solution containing, ten parts of hyposulfite of soda, $(Na_2S_2O_3 + 5H_2O)$ and ninety parts of water, for a period of ten minutes, for the purpose of fixing or setting the mordant bichromate of potash in the gelatin and the strips are then washed in water to remove all surplus chemicals. The strips are now ready for the final treatment and to be put in commercial form. This is accomplished by special apparatus which is shown on the drawings at Figs. 5 to 9, inclusive. This above-mentioned apparatus comprises a cast iron wheel mounted upon one end of a horizontally-projecting shaft 11, placed in bearings 11' fixed to a bench 23, in such manner that the said wheel may freely revolve in either direction when free from locking devices hereinafter described. The rim or periphery of this forming wheel 12, is semicircular in cross-section and is divided at one point 14, said semicircle being of a diameter equal to that of the inner air-retaining tube 10 (Fig. 11) for which the shield or armor is intended. Arranged at one side of the division 14, and beneath a thickened part 12' of the rim of the wheel, is a semi-circular clamp 19, with two set screws 20, by means of which one end of the strip 4 is held firmly bound to the said rim. Loosely mounted on the horizontally-disposed shaft 11, and at either side of the rim of the wheel 12, are the arms of a hand-lever 22, one of said arms having an attached ratchet wheel 15, adapted to engage with a pawl 16, which will permit said lever to move freely in one direction, said pawl being formed with an integral hand lever 17 and is mounted on a shaft in a bearing 16', as will be best seen by reference to Fig. 6, of the drawings. Between the arms 21 and near the top of the same, is a journaled roller 26 and immediately above said roller, is a convex eccentric 25, with hand lever 25', which device will form a clamp to grasp and retain the strip at any point along its length when the same is inserted between the two parts, as shown at Fig. 5. The wheel 12 is held stationary by means of a removable pin 18, entering a recess formed in the bench 23, by engaging with one of the spokes of said wheel.

After the strips 4 have been removed from the last mentioned solution of water and hyposulfite of soda and washed, they are brought to one of these mounted wheels. One end of a strip is inserted between the open clamp 25—26, of the hand lever and the other end carried forward and passed downward through the slot 14, and said end firmly fixed within the rim-clamp 19. The hand lever 22 is brought to about the position shown at Fig. 5, of the drawings. The eccentric 25 is thrown down to clamp the strip 4, and pressure brought against the hand lever to stretch a small portion of said strip over the rim of the wheel 12. The lever holds the strip in its stretched condition by the aid of the ratchet wheel 15 and pawl 16. While this above-described portion of the strip is held taut, small clamps, such as shown at Figs. 8 and 9, are brought into use and one or more placed to confine the edges of said strip beneath the peripheral edges of the rim of the wheel, as particularly shown at Fig. 8, the said clamp consisting of two jaws 27, with binding screws 28, attached to right and left threaded shaft fitted with a hand wheel 29. By means of these clamps 27, the strip 4 is stretched laterally and prevented from undue shrinkage. The pin 18 holding the wheel 12 stationary is now removed from its socket and the said wheel revolved a short distance toward the right, and said pin again inserted to engage with another spoke to confine the wheel in its altered position. The eccentric 25 is now released from its grip on the strip 4 and the lever 22 moved to the left and again engaged with the strip, as above described, and the operation continued, care being taken to use the lateral clamps freely until the entire strip is bound to the wheel 12, at which time said wheel and strip is removed to the drying room and exposed to diffused daylight for a period of from two to three days.

After the drying of the strip has been accomplished, the wheel 12 with its attached strip 4, is placed upon a rotatable horizontally-disposed shaft and by means of a suitable tool (not shown) the edges of the strip are reduced or beveled, as shown at Fig. 4, of the drawings. The strip 4 is now removed from the wheel 12, and the ends of said strip beveled to reduce the double thickness of the shield, due to the overlap when placed within the tire.

By this process of treating or hardening the green hide, the same is converted by contraction and by the action of the light on the chemicals contained therein, into a hard insoluble, puncture proof material, and when inserted between the inner tube 10, (Fig. 11) and the shoe 9 of the pneumatic tire, the said inner tube will be fully protected from puncture, and owing to the flexibility, yielding and springy nature of said article, the resiliency of said tire is in nowise affected.

The material made by this above-described process may be used for many other purposes, where a hardened, heat-resisting, puncture proof and non-conducting material is desired, such as packing for piston rods of steam engines, insulation for electric appliances, &c., &c.

Armor strips made under this process have been tested with satisfactory results.

In the use of these strips or armor, I prefer to inclose the same within a covering of cotton fabric, such as canvass, the same being cemented thereto by a gelatinous bichromate of potash cement. The cotton covering may be placed about the armor in any desired form, and will prevent creeping or annular movement of said armor within the tire, as said armor without such covering will present a smooth, even, polished surface to the parts of the tire.

If it is so desired the armor may be placed on the tread of the shoe 9, and held in position by cementation, or otherwise attached.

The proportion of ingredients used in the several solutions mentioned to accomplish the several steps of the process, may be varied and departures made from the specific formulas given, without departing from the spirit of the invention.

Having thus described my invention, what I claim, and desire to secure by Letters Patent, is—

1. The herein-described process of treating hides or skins for the purpose specified, consisting of treating said hide with bichromate of potash ($K_2Cr_2O_7$) in solution, exposing said hide to the action of diffused daylight, densifying by a bath in a solution of gelatin, bichromate of potash and water brought to a temperature of approximately two-hundred and thirteen degrees, Fahrenheit and again exposing the hide to the action of the light, as described.

2. The herein-described process of treating hides or skins for the manufacture of shields or armors for pneumatic tires, consisting of cutting said hide lengthwise into strips, treating said strips with bichromate of potash in solution, exposing said strips thus treated to the action of diffused daylight and at the same time treating the edges of said strips to a bath of diluted bichromate of potash, sulfate of alumina and chlorid of sodium to soften said edges, densifying the central portion of the strips by immersing in a solution of gelatin, bichromate of potash and water brought to the boiling point, securing said strips to forms and again exposing the same to the action of light, as described.

In testimony whereof, I affix my signature, in presence of two witnesses.

OTTO A. HENSEL.

Witnesses:
Wm. G. Walter,
Geo. Kramer.